Figure 1:
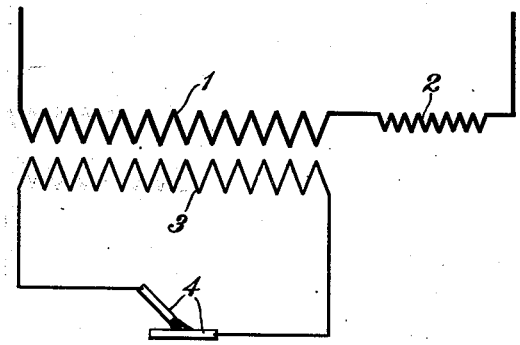

O. H. ESCHHOLZ.
ARC WELDING SYSTEM.
APPLICATION FILED SEPT. 8, 1919.

1,343,201.

Patented June 15, 1920.

WITNESSES:
R. J. Fitzgerald
J. E. Bee.

INVENTOR
Otto H. Eschholz.
BY
Wesley G. Carr
ATTORNEY

UNITED STATES PATENT OFFICE.

OTTO H. ESCHHOLZ, OF WILKINSBURG, PENNSYLVANIA, ASSIGNOR TO WESTINGHOUSE ELECTRIC & MANUFACTURING COMPANY, A CORPORATION OF PENNSYLVANIA.

ARC-WELDING SYSTEM.

1,343,201.  Specification of Letters Patent.  Patented June 15, 1920.

Application filed September 8, 1919. Serial No. 322,283.

*To all whom it may concern:*

Be it known that I, OTTO H. ESCHHOLZ, a citizen of the United States, and a resident of Wilkinsburg, in the county of Allegheny and State of Pennsylvania, have invented a new and useful Improvement in Arc-Welding Systems, of which the following is a specification.

My invention relates to electric-arc welding systems and particularly to arc welding systems in which alternating current is employed. The primary object of my invention is to improve the starting characteristics of an alternating-current arc welding system.

Heretofore, considerable difficulty has been experienced in welding by means of alternating currents on account of the fact that the reversals of current tend to produce unstable conditions and cause great difficulty in starting or drawing an arc. It has been found that an electric arc may be readily operated when maintained by an alternating current after the arc has been started. One object of my invention, therefore, resides in the provision of a welding system in which an alternating current may be employed by improving the starting characteristics to facilitate drawing of the arc.

I have found that an arc may be more readily drawn in an alternating-current system if the voltage or the current strength is increased. Extensive experiments have established the fact that a greater advantage is obtained from an increase, above the normal operating value, in the voltage of the system than may be obtained with a proportional increase in the starting current. This is true on account of the fact that the employment of a heavy starting current tends to cause the electrode to fuse or "freeze" to the material. However, it has been found advantageous to employ either an increase in the starting voltage or in the current or an increase in both.

Another object of my invention resides, therefore, in provision of means for increasing the starting voltage of an alternating-current system and means for automatically reducing the starting voltage to a desirable operating value.

With these and other objects in view, my invention will be more fully described, illustrated in the drawings, in the several views of which corresponding numerals indicate like parts, and then particularly pointed out in the claims.

Figure 2:
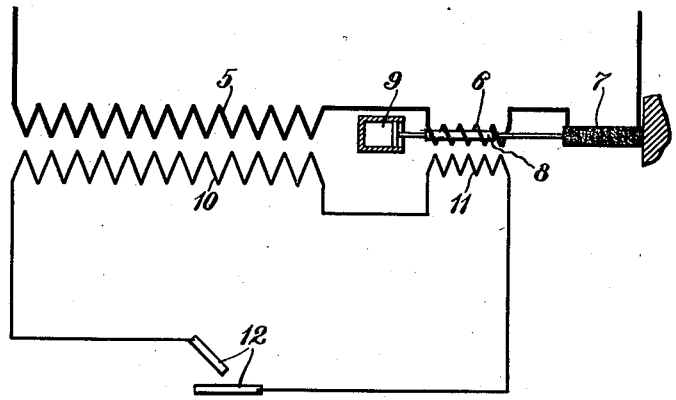

In the drawings, Figure 1 is a diagrammatic view of an electric-arc welding system which embodies my invention, and Fig. 2 is a similar view illustrating a modification of my invention.

I have found that desirable starting characteristics may be obtained by employing a variety of forms of resistances inserted in the primary or in the secondary circuit of a welding transformer. All of the resistors and the manner of inserting them in the circuits embody the same general principle. I have found that three distinct types may be employed. First, a selective resistor, that is, a resistor having a large temperature-resistance co-efficient, second, a carbon-pile type of resistor in which a change in resistance may be accomplished by a change in contact pressure and third, a variable step resistor. I have tested these various types of resistors and find that they produce desirable characteristics tending to facilitate the starting of an arc in an alternating-current system.

In Fig. 1 is shown a primary winding 1 of a transformer having a resistor 2 connected in series therewith. A secondary winding 3 may be connected to the welding electrodes 4. The above described system contemplates the employment of the selective resistor in series with the primary winding 1 of the welding transformer. The resistor 2 should have such characteristics, that, on bringing the electrodes 4 into engagement, its resistance is low, but, after the arc has been drawn between the electrodes for a short period of from about one-half to two seconds or more, the resistance of the resistor 2 immediately increases. It will be appreciated that a resistor placed in the system, as above described, and possessing the characteristics named, will tend to produce a high starting voltage, in the secondary or welding circuit, which shall be decreased after the high voltage has served its purpose, namely to facilitate drawing the arc.

The resistor placed in the primary circuit, as above described, not only increases the arc-sustaining voltage but also increases the starting current to a value above the subsequent normal operating value. The resistor 2 may also be placed in the secondary circuit or in series with the secondary winding 3, and considerable advantage may be obtained from this arrangement. However, if such connections are employed, the starting arc current will be higher than the normal welding current but the arc-sustaining voltage will remain approximately the same.

One distinct advantage of employing a system of the above designated character lies in the fact that no switches are utilized and the power factor of the circuit is increased. The selective resistor may be of at least two types, first, the characteristics may be determined by its temperature-resistance co-efficient. A typical metal that may be employed for this purpose is iron. If the iron is operated at a temperature where oxidization is excessive, various protective coatings may be applied, such as chromium, nichrome, or the like, or the resistance may be operated in a vacuum.

Another form of selective resistor may utilize the characteristic of varying contact resistance with change in contact pressure. In order to illustrate the employment of such a resistor, another welding system is shown in Fig. 2 comprising a primary winding 5 which is connected in series with a coil 6 and a carbon pile 7. The winding 6 is so connected as to operate a plunger or core 8 which may be connected, at one end, to the carbon pile 7 and, at its other end, to a suitable retarding device 9. A secondary winding 10 may be connected in series with a coil 11, which is inductively related to the coil 6, and in series with the electrodes 12.

It will be apparent from the description of the system shown in Fig. 2, that, when the primary winding is connected to a source of electric current, the coil 6 will be energized and tend to so move the core 8 as to compress the carbon pile 7, thereby decreasing its resistance. When the electrodes 12 are brought into engagement, a circuit is established in the secondary winding and the coil 11 is energized and is so arranged as to tend to neutralize the action of the coil 6 and cause the core 8 to release the pressure upon the carbon pile 7 to thereby increase its resistance. The retarding device 9 may be omitted, if desired, but, in some instances, such a device may prove advantageous in regulating the time of increase or decrease in resistance of the carbon pile. It will be apparent, therefore, that, during the period of establishing an arc, the carbon pile will be under maximum pressure, and, therefore, will offer a minimum resistance to the flow of current. Furthermore, as soon as the arc is established, or a short interval thereafter, the pressure will be sufficiently released to increase the resistance of the carbon pile to a value at which a normal operating value of welding current will obtain in the circuit.

It will be appreciated that the foregoing systems will greatly facilitate the drawing of an arc in an alternating-current welding system without introducing any material complications in the systems. Furthermore, it will be apparent that many types of resistors may be employed and various connections utilized in establishing them in an electric welding system in accordance with the principle of my invention. I do not desire, therefore, to be restricted to the particular arrangement of systems shown and described but desire to cover all such systems as fall within the scope of the appended claims.

I claim as my invention:—

1. An electric-arc welding system comprising a transformer having a primary winding, a resistor connected in series with the winding and a secondary winding connected to the electrodes.

2. An electric-arc welding system comprising a transformer having a primary and a secondary winding, the former of which may be connected to a source of alternating current and the latter of which is connected to the electrodes of the system, and a resistor, the resistance of which increases under the influence of an electric current, connected in series with one of the windings.

3. An electric-arc welding system comprising a primary winding adapted to be connected to a source of electric current, a resistor, the resistance of which increases to a limiting value under the influence of an electric current, connected in series with the primary winding, and a secondary winding connected to the electrodes of the system.

4. An electric-arc welding system comprising a primary winding adapted to be connected to a source of electric current, means connected in series with the primary winding for gradually reducing the voltage thereof, and a secondary winding connected in series with the electrodes of the system.

5. An electric-arc welding system comprising a primary winding adapted to be connected to a source of electric current, a secondary winding connected to electrodes and means, connected in series with the primary winding, for reducing the voltage thereof after an arc has been established between the electrodes.

6. An electric-arc welding system comprising a primary winding, a coil, having a core member, connected in series with the winding, a contact resistor connected in series with the coil and adapted to have its resistance varied by movement of the core, a secondary winding connected, at one side, to an electrode and a second coil connected to the secondary winding and to the other electrode and adapted to neutralize the action of the first coil and increase the resistance of the resistor when an arc is established between the electrodes.

7. An electric-arc welding system comprising a primary winding, a coil having a core member and connected in series with the winding, a carbon pile connected in series with the coil and adapted to have its resistance varied by movement of the core, a secondary winding connected, at one side, to an electrode and a second coil connected to the secondary winding and to the other electrode and adapted to neutralize the action of the first coil and increase the resistance of the carbon pile when an arc is established between the electrodes.

8. An electric-arc welding system comprising a primary winding, a coil having a core member and connected in series with the winding, a contact resistor connected in series with the coil and adapted to have its resistance varied by movement of the core, a retarding device secured to the core, a secondary winding connected, at one side, to an electrode and a second coil connected to the secondary winding and to the other electrode and adapted to neutralize the action of the first coil and increase the resistance of the resistor when an arc is established between the electrodes.

In testimony whereof I have hereunto subscribed my name this 30th day of July, 1919.

OTTO H. ESCHHOLZ